United States Patent [19]

Weber

[11] Patent Number: 4,799,781
[45] Date of Patent: Jan. 24, 1989

[54] EYEGLASSES WITH DETACHABLE LENSES

[75] Inventor: Karl Weber, Stuttgart, Fed. Rep. of Germany

[73] Assignee: Polaroid Corporation, Cambridge, Mass.

[21] Appl. No.: 127,294
[22] PCT Filed: Feb. 27, 1987
[86] PCT No.: PCT/EP87/00117
§ 371 Date: Oct. 30, 1987
§ 102(e) Date: Oct. 30, 1987
[87] PCT Pub. No.: WO87/05405
PCT Pub. Date: Sep. 11, 1987

[30] Foreign Application Priority Data

Mar. 1, 1986 [DE] Fed. Rep. of Germany ... 8605669[U]

[51] Int. Cl.$^4$ .......................... G02C 1/00; G02C 5/04
[52] U.S. Cl. .................................... 351/86; 351/154; 351/128
[58] Field of Search ................. 351/86, 128, 154, 44, 351/47, 48

[56] References Cited

U.S. PATENT DOCUMENTS 4,176,921 12/1979 Matthias .

FOREIGN PATENT DOCUMENTS 3032012 4/1982 Fed. Rep. of Germany .
2503878 10/1982 France .
2503879 10/1982 France .
2538920 7/1984 France .
2123574 2/1984 United Kingdom .

Primary Examiner—Rodney B. Bovernick
Attorney, Agent, or Firm—Karl Hormann

[57] ABSTRACT

Eyeglasses having lenses mounted in individual sockets and retained therein by hook members partially extending across the lens surfaces, the sockets being connected by a bridge which is vertically slidable and includes hook members movable into and out of engagement with the lens surfaces for easy removal or installation of the lenses into their sockets.

9 Claims, 2 Drawing Sheets

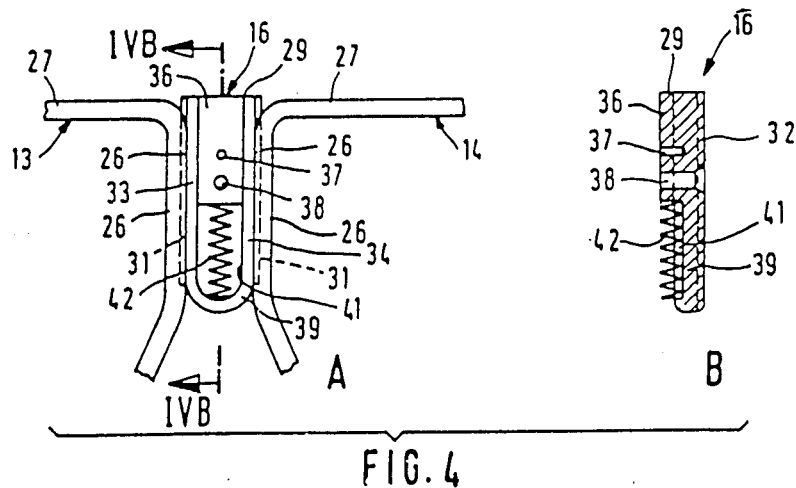
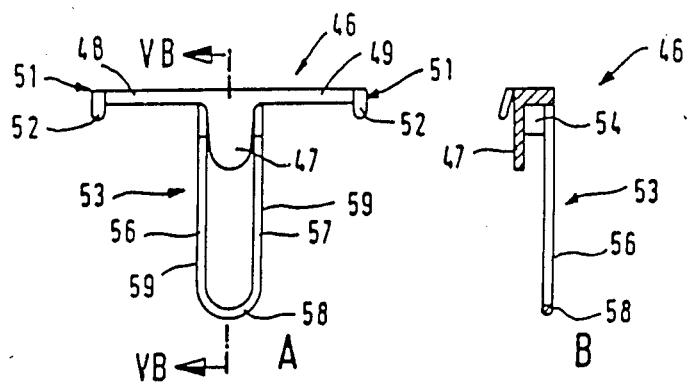
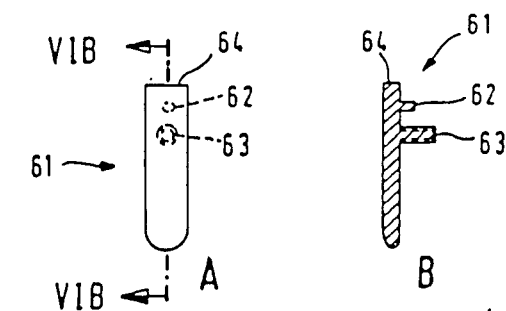
FIG. 4
FIG. 5
FIG. 6

EYEGLASSES WITH DETACHABLE LENSES

The invention relates to eyeglasses, especially sunglasses.

Especially with sunglasses, there is a problem when buying them, namely which glasses are the right ones, i.e. whether the sunglasses are primarily to be used during week days in the summer, during vacation at the beach, or in the winter in the mountains with snow. The tint intensity (the degree of light absorption) of the glasses depend on this. As a compromise one sometimes uses photochromic glasses, the absorption level of which changes with the ambient brightness. But here, too, there are glasses with different basic tint and, hence, different maximum tinting capability. This is true also for glasses with ground lenses, when phototropic glasses are used here. Sunglasses frequently also use lenses with a mirror coating on the outside. Since the eyeglass frames in particular, depending on their design, are quite expensive, it is very expensive for the user to purchase several pairs of eyeglasses.

It is, therefore, the task of the present invention to create eyeglasses, especially sunglasses of the type mentioned in the introduction, in which the eyeglass frames may be used with different lenses as desired.

Since the lenses may manually be changed on the eyeglass frame, in simple manner, without the use of tools, it is possible for the user to purchase several different lenses for one frame, these lenses differing, for example, in their absorption levels (light, medium, dark, very dark). For example, it is possible to use light-sensitive phototropic lenses or mirror-coated lenses. The essential point is that the user may very quickly and at any time substitute one pair of lenses for another.

The structure of the invention is very practical as regards to handling and is very economical as regards to manufacture, as the bridge member which is present between the sockets anyway, may be used at once as a mounting bracket and as a slide. According to this structure, a one-piece slide-like component is provided which comprises the hook-shaped webs for both lenses. It is also possible to provide two parallel slide components, one for each lens. Handling is therefore especially simple for the user and may be performed even by unskilled users, since the slide-like part when held by one hand may simply be pushed upwardly by the thumb of the same hand; and in this open position, the respective lens may be removed by the user's other hand.

Preferably each lens is safely and immovably retained by three hook-shaped webs only and by an abutment surface for a marginal area of the lens at the slide or at the bridge.

In order to achieve safe locking or retention of the lenses in the closed position of the slide-like part under any circumstances, the slide-like part may be biased into its closed position by spring action, and may be moved into its open position against the bias of this spring. Thus, no particular manual motion is required to reach the closed position.

Advantageously, the bridge may be used not only as a guide for the slide-like part, but also for receiving the spring. The spring preferably is a pressure spring. The pressure spring may be stored in a recess of the bridge, entirely as regards its length and partly as regards its diameter, so that the spring may act on the slide-like part which may be positioned on the bridge. The pressure spring is maintained in its position by a cover plate.

The slide-like part is guided between this cover plate and the bridge in a portion removed from the guide grooves of the bridge.

The plate, furthermore, is used as a stop for the slide-like part in its locked position and, by way of a protruding threaded pin penetrating into the bridge, it is used to maintain the displacement mechanism in its assembled state.

Further details and embodiments of the invention may be found in the following description, in which the invention is described and elucidated in more detail by way of the embodiment shown in the drawings.

FIGS. 4A and 4B show a magnified top view of the bridge of the eyeglass frame, without lenses, and a section along the line IVB—IVB of FIG. 4A.

FIGS. 5A and 5B show a magnified front view of the slide-shaped part of the above-mentioned mechanism to replace the glasses, and a section along the line VB—VB of FIG. 5A.

FIGS. 6A and 6B show a magnified top view of a cover plate of the above-mentioned mechanism to replace the lenses, and a section along the line VIB—VIB of FIG. 6A.

Figure 1:
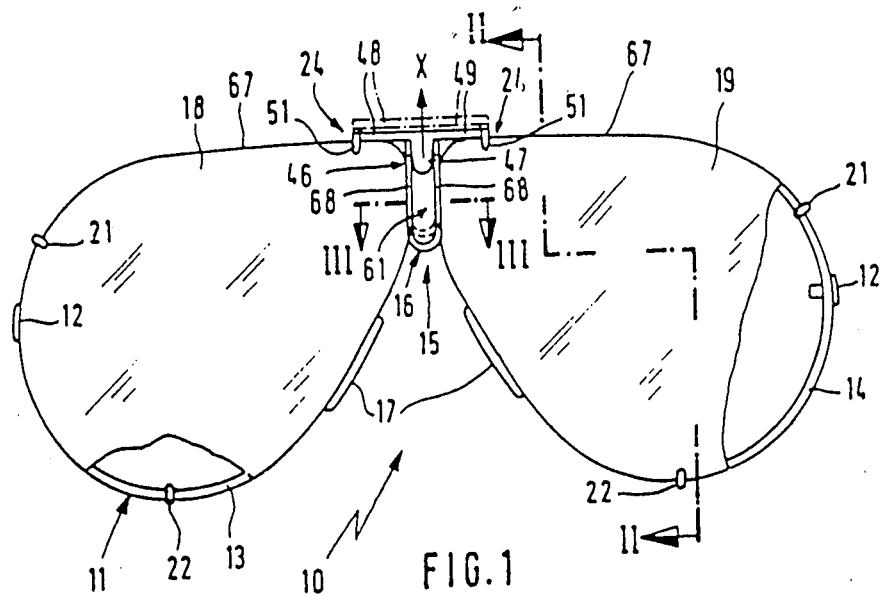
FIG. 1 shows a partly exploded frontal view of sunglasses with a mechanism to replace the lenses according to a preferred embodiment of the present invention.
Figure 2:
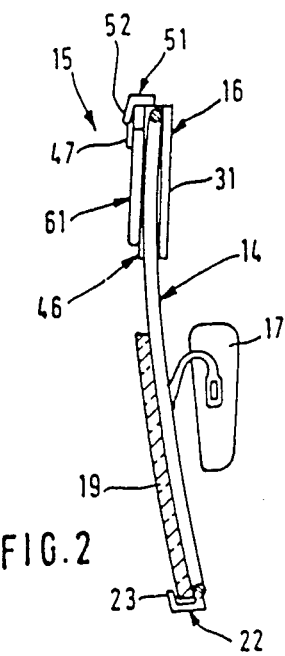
FIG. 2 shows a section along the line II—II of FIG. 1, where the upper part is shown without an inserted lens and the lower part with an inserted lens.

The sunglasses 10 shown in the drawing are provided with a mechanism 15 for replacably retaining lenses 18, 19. They comprise an eyeglass frame member 11 which is connected to pivotable temple pieces (not shown) by way of fixed temple pieces 12. Two frame members or sockets 13, 14 of the frame 11 are each provided with a nose support 17, and are rigidly connected to each other by means of a bridge 16. The lenses 18, 19 are positioned on the outside of the sockets 13, 14. The lenses are retained in the sockets 13, 24 by hook members 21, 22, respectively positioned above and below the temple piece 12. The hook members 21, 22 have a portion extending vertically from the sockets 13, 14 as well as a portion, remote from the socket 13, 14 extending over marginal portions of the lens 19. They are held in such a fashion that the inwardly bent ends 23 of the hooks 21, 22 engage the lenses 18, 19. A third holding area 24 for the lenses 18, 19 at the sockets 13, 14 is estimated by the mechanism 15. This third holding area 24 can be moved from a locked position into an open position. The mechanism 15 is situated in the area of the bridge 16 and includes the latter. As will still be shown, the lenses 18, 19 may be removed and replaced by other lenses by moving the movable part of the mechanism 15 to its open position as indicated by the arrow X in FIG. 1.

Figure 3:
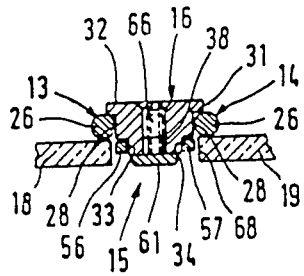
FIG. 3 shows a section along the line III—III of FIG. 1.

As may be seen especially in FIG. 4, the bridge 16 is shaped as a longitudinally rectangular block at parallel longitudinal sides 28 of which there is attached, preferably soldered, a correspondingly shaped linear lateral portion 26 of the sockets 13, 14. The upper front edge 29 of the bridge 16 is approximately flush with the upper approximately horizontally extending portion 27 of the sockets 13, 14. Web-like extensions of the bridge 16 (see also FIG. 3) are partially positioned behind the lateral positions 26 of the sockets 13, 14. Facing away from the rear surface 32 of the bridge 16, the longitudinal sides 28 of the bridge 16 extend into parallel guide grooves or recesses 33, 34 which are open not only towards the side but also towards the front. The guide grooves 33, 34 extend from the upper front side 29 over approximately half the length of the bridge 16. In this protruding area 36 of the bridge 16 which is laterally bounded by the guide grooves 33, 34 there are provided, spaced from each other, a recess 37 positioned near the upper edge 29 and a larger diamater bore 38. A rearwardly extending portion 39 is connected to the forwardly extending portion 36. The former has a recess 41, the width and length of which are somewhat smaller than that of the rearwardly extending portion 39.

A pressure spring 42 in a slightly tensioned state is inserted into the recess 41 of the bridge 16. One of its ends is supported at the forwardly protruding portion 36 and its other end is supported at the lower edge of the recess 41. The diameter of the pressure spring 42 is larger than, for example twice the depth of the recess 41.

In addition to the bridge 16, a slide 46, shown in detail in FIG. 5, constitutes a part of the mechanism 15. The slide 46 comprises an escutcheon shaped center portion 47, at the upper end of which there are provided integral cantilever arms 48 and 49, which are integrally connected to, and extend in opposite directions from one another. At their free ends the cantilever arms 48 and 49 are provided with hook members 51, end portions 52 of which extend over the lenses 18, 19. Legs 56, 57 of a U-shaped runner member 52 are connected to the cantilever arms 48, 49 and are positioned at opposite sides of the center section 47. The parallel legs 56, 57 respectively fit into the guide grooves 33, 34 of the bridge 16 and at an upper part they are provided with a connecting web 54 facing the center section 47.

Furthermore, the mechanism 15 comprises a cover plate 61 (FIG. 6) of an approximately longitudinally rectangular shape, but the lower edge of which is rounded or semi-circular. At its inside surface the cover plate 61 is provided with a shorter arresting pin 62 and a longer pin 63 having an exterior thread and a larger diameter. The two pins 62 and 63 are spaced from each other at a distance corresponding to the bore 37, 38 in the bridge 16 and protrude vertically from the back side:

In the embodiment shown, both the frame 11 and the mechanism 15 including the bridge 16 are made of metal.

The assembly and the interaction of the described parts 16, 42, 46, 61 and a screw 66 having an axial threaded bore in its shank are as follows:

The pressure spring 62 is inserted into the recess 41 of the bridge 16 with a slight pre-tension. The slide 46 is placed on the bridge 16 so that the legs 56, 57 of the runner 53 are positioned in the guide grooves 33, 34 and at both sides of the recess 41 on the backwardly protruding area 39. Thus, the lower end of the pressure spring 42 is surrounded by the U-shaped area 58 which connects the two legs 56, 57. Furthermore, the dimensions are such that the longitudinally extending outer edges 59 of the runner 53 are flush with the longitudinal sides 28 of the bridge 16. The cover plate 61 is placed on the forwardly extending area 36 of the bridge 17 in such a manner that the retention pin 62 is inserted into the recess 37 and the threaded pin 63 is inserted into the bore 38. However, this may be accomplished only when the slide 46 has been slidingly moved upwards in the direction of the arrow X, against the bias of the pressure spring 42 which contacts the U-shaped part 58. The assembly of the mechanism 15 is completed by inserting the sleeve screw 66 from the back side 32 of the bridge 16 into the bore 38 and screwing onto the threaded pin 63 of the cover plate 61. In its assembled state, the width of the cover plate 61 is approximately equal to the outer distance between the legs 56, 57 of the slide 46. Since the cover plate 61 extends to the end of the recess 41 in the forwardly extending area 36 of the bridge 16, the pressure spring 42 is completely covered. Furthermore, a guide for the U-shaped area 58 of the runner 53 is derived from the appropriate spacing between the inside of the cover plate 61 and the surface of the backwardly protruding region 31 where the recess 41 begins.

The normally locked position of the mechanism 15 resulting from the bias of the pressure spring 42, is shown in solid lines in FIG. 1. In this closed position, the hooks 51 of the slide 46 grip the lenses 18, 19. In this state, the lower edge of the connecting webs 54 of the slide 46 lies at the upper front face 64 of the cover plate 61, which thus serves as a locking stop. In the locked position the lenses 18, 19 are secured against falling out of their sockets by means of the three hooks 21, 22, and 54. They are secured against movement relative to the mount 13, 14 in virtue of the fact that the inner straight edge area 68 of the lenses 18, 19 directly contacts the respective exterior side 59 of the legs 56, 57.

If the mechanism 15 or the slide 46 is pushed upwardly by the thumb of a user into the open position in the direction of the arrow X (the open position being shown in dashed lines in FIG. 1), the hooks 51 of the slide 46 will extend over the upper circumferential region 67 of the lenses 18, 19. Thus the respective lens 18 or 19, with its inside marginal area 68, may be swung away from the lens mount 13 or 14, respectively, until it reaches over the forwardly protruding area 36 of the bridge 16. Then the lens may be pulled from its socket in the direction of the other socket. The lenses 18, 19 are inserted in correspondingly reversed fashion.

It is understood that the lenses, in place of contacting the outside of the mounts completely, may alternatively be connected with the sockets of the eyeglass frame in such a fashion that they are partly or wholly recessed therein. Furthermore, it is also possible that this mechanism for replacing lenses may be used not only with sunglass lenses without optical action but also with lenses providing for optical action.

I claim:

1. Eyeglasses, in which lenses are positioned on sockets connected by a bridge and retained by hook-shaped members attached to the sockets and extending over the lenses, characterized by the fact that the bridge (16) comprises at least one slidable member (46) preferably vertically slidable between open and closed positions provided with two hook members (51) at preferably two cantilever arms (48, 49) extending parallel to the bridge 16, said hooks (51) of the slidable members each grasping a respective lens (18, 19) when the slidable member (46) is in its closed position.

2. Eyeglasses according to claim 1, characterized by the fact that the slidable member (46) is biased into its closed position by the action of a spring (42), and is movable into its open position against the bias of said spring.

3. Eyeglasses according to claim 1, characterized by the fact that the bridge (16) comprises a guide for the slidable member (46).

4. Eyeglasses according to claim 1, characterized by the fact that the bridge (16) is provided with guide grooves (33, 34) at its side edges, for movably retaining parallel leg members (56, 57) of a runner member (53) of the slidable member (46).

5. Eyeglasses according to claim 1, characterized by the fact that the bridge (16) is provided with a recess (41) in extension of its guide grooves (33, 34) for at least partially retaining the spring (42), which is preferably a pressure spring; that the legs (56, 57) of the runner member are provided with a preferably U-shaped connection (58) at their end turned away from the guide grooves (33, 34); and that the pressure spring (42), inserted in the recess (41) and retained between the runner member (53) of the slidable member (46), is covered by a plate member (61).

6. Eyeglasses according to claim 5, characterized by the fact that the leg members (56, 57) are guided between the plate member (61) and the opposite region (39) of the bridge (16) in that region which faces away from the guide grooves (33, 34).

7. Eyeglasses according to claim 5, characterized by the fact that the plate member (61) is provided with a threaded pin (63) and a retention pin (62) disposed at some distance therefrom, which are seated in corresponding bores (37, 38) of the bridge (16).

8. Eyeglasses according to claim 1, characterized by the fact that upper surface (64) of the plate member (61) comprises an abutment edge for the slidable member (46) in its closed position.

9. Eyeglasses according to claim 1, characterized by the fact that the lenses (18, 19) are retained in the frame (11) by two fixed hook members and by one movable hook member (21, 22; 51) and by an abutment surface on the bridge (16) or on the slidable member (46).

* * * * *